(12) United States Patent
Horio et al.

(10) Patent No.: US 7,662,483 B2
(45) Date of Patent: Feb. 16, 2010

(54) OPTICAL LAMINATE

(75) Inventors: Tomoyuki Horio, Tokyo-To (JP); Hiroomi Katagiri, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 276 days.

(21) Appl. No.: 11/226,848

(22) Filed: Sep. 14, 2005

(65) Prior Publication Data

US 2006/0134429 A1    Jun. 22, 2006

(30) Foreign Application Priority Data

Sep. 29, 2004  (JP)  ............................. 2004-283497
Mar. 15, 2005  (JP)  ............................. 2005-073822

(51) Int. Cl.
*B32B 27/30* (2006.01)
*B32B 27/32* (2006.01)

(52) U.S. Cl. .................. 428/522; 428/523; 428/500
(58) Field of Classification Search ............... 428/411, 428/412, 423.1, 411.1, 500, 522, 523
See application file for complete search history.

(56) References Cited

U.S. PATENT DOCUMENTS

| 5,747,152 | A | * | 5/1998 | Oka et al. | .................. 428/323 |
| 5,770,306 | A | * | 6/1998 | Suzuki et al. | ................ 428/328 |
| 6,207,263 | B1 | * | 3/2001 | Takematsu et al. | .......... 428/220 |

* cited by examiner

*Primary Examiner*—Thao T. Tran
(74) *Attorney, Agent, or Firm*—Burr & Brown (57) ABSTRACT

An optical laminate is provided including a thin layer formed of a resin having a weight average molecular weight of not less than 200 and not more than 1000 with three or less functional groups and a penetrative solvent is provided on a light transparent base material, and a hardcoat layer is provided on the thin layer.

9 Claims, 2 Drawing Sheets

OPTICAL LAMINATE

RELATED APPLICATION

This application is a patent application claiming priority based on Japanese Patent Application Nos. 283497/2004 and 73822/2005, the entirety of which is incorporated herein.

TECHNICAL FIELD

The present invention relates to an optical laminate that prevents interface reflection and interference fringes.

BACKGROUND ART

Image display surfaces in image display devices such as liquid crystal displays (LCDs) or cathode ray tube display devices (CRTs) are required to reduce the reflection of light applied from an external light source and thus enhance the visibility of the image. To meet this demand, it is common practice to utilize an optical laminate comprising an anti-dazzling layer or anti-reflection layer provided on a light transparent base material (for example, an anti-reflective laminate) and thus to reduce the reflection of light frorri an image display surface in the image display device, whereby the visibility of the image is improved.

In an optical laminate comprising layers with a large refractive index difference stacked on top of each other, however, interface reflection and interference fringes often occur at the interface of the mutually superimposed layers. In particular, when black is reproduced on an image display surface in a screen display device, the occurrence of interference fringes is significant, resulting in lowered image visibility. Further, in this case, the appearance of the image display surface is deteriorated. In particular, interference fringes are likely to occur when the refractive index of the light transparent base material and the refractive index of the hardcoat layer are different from each other.

On the other hand, Japanese Patent Laid-Open No. 75605/2003 proposes an antireflection hardcoat sheet comprising a transparent base material film and, provided on the transparent base material film in the following order, an intermediate-refractive index layer having a refractive index of 1.5 to 1.7, a higher-refractive index layer having a refractive index of 1.6 to 1.8, and further a lower-refractive index layer formed of a material having a lower refractive index than the higher-refractive index layer stacked. The advantage of this antireflection hardcoat sheet is to eliminate the interface reflection, interference fringes and the like. This prior art technique has been accomplished by focusing on the materials that constitute each layer. Further, Japanese Patent Laid-Open No. 205563/2003 proposes a method in which a hardcoat layer is formed on a base material by using a resin containing a solvent capable of dissolving the base material.

To date, there is no prior art recognition that interface reflection and interference fringes can be effectively prevented by forming a thin layer using a resin having specific properties before forming a hardcoat layer on the light transparent base material to improve the state of the interface between the light transparent base material and the hardcoat layer.

SUMMARY OF THE INVENTION

At the time of this invention, the present inventors have found that the occurrence of the interface reflection and interference fringes can be effectively prevented by previously forming a thin layer, at the interface between the light transparent base material and the hardcoat layer, using a resin having specific properties and a penetrative solvent. Accordingly, an object of the present invention is to provide an optical laminate having improved mechanical strength and visibility by effectively preventing interface reflection and interference fringes at the interface between the light transparent base material and the hardcoat layer.

According to the present invention, an optical laminate is provided, comprising a hardcoat layer provided on a light transparent base material, wherein a thin layer formed of a resin having a weight average molecular weight of not less than 200 and not more than 1000 with three or less functional groups and a penetrative solvent is provided on the light transparent base material, and wherein the hardcoat layer is provided on the thin layer.

BEST MODE FOR CARRYING OUT THE INVENTION

1. Optical Laminate

Thin Film

In the optical laminate according to the present invention, a thin layer formed of a resin having a weight average molecular weight of not less than 200 and not more than 1000 and containing three or less (preferably one or two) functional groups is provided on the light transparent base material. The formation of this thin layer effectively prevents interface reflection and interference fringes caused at the interface between the light transparent base material and the hardcoat layer.

In the present invention, a major function of the thin layer is to eliminate the interface between the light transparent base material and the hardcoat layer. This includes such a state that the interface is substantially absent. Here the wording "the interface is (substantially) absent" as used herein embraces not only the case where, although two layer surfaces are put on top of each other, the interface is actually absent between the two layers, but also the case where, in view of the refractive index, it is judged that an interface is absent between the two layers. The specific standard of "the interface is (substantially) absent" may be, for example, that in the observation of the section of an optical laminate under a laser microscope, an interface is present in the section of the laminate in which interference fringes are visually observed, while an interface is absent in the section of the laminate in which interference fringes are not visually observed. The laser microscope can nondestructively observe the section of a laminate comprising layers different from each other in refractive index, and, thus, in a laminate comprising materials not having any significant refractive index difference, the results of measurement are such that any interface is not present. Accordingly, also based on the refractive index, it can be judged that any interface is not present between the base material and the hardcoat layer.

In the present invention, this "thin layer" embraces the concept of a thin film, a thin coating film and the like. In a preferred embodiment of the present invention, the thickness of the thin layer is not less than 0.001 µm and not more than 50 μm. Preferably, the lower limit of the layer thickness is 0.01 μm, and the upper limit is 20 μm.

1) Resin

The resin usable for thin film formation has a weight average molecular weight of not less than 200 and not more than 1000. Preferably, the lower limit is 220, and the upper limit is 900.

A specific example of the above resin is one resin or a mixture of two or more resins selected from the group consisting of acrylic resins, polyester resins, polyolefin resins, polycarbonate resins, polyamide resins, poly ether resins, epoxy resins, urethane resins, alkyd resins, spiroacetal resins, polybutadiene resins, polythiol polyether resins, polyhydric alcohols, and (meth)acrylate resins such as ethylene glycol (meth)acrylate and pentaerythritol (meth)acrylate monostearate. Preferred are urethane resins.

Specific examples of resins belonging to these resins include compounds, for example, ethylene glycol diacrylate, triethylene glycol diacrylate, propylene glycol diacrylate, neopentyl glycol diacrylate, 1,6-hexanediol diacrylate, and triethylene glycol diacrylate; acrylates such as dipropylene glycol diacrylate, tripropylene glycol diacrylate, 1,4-butanediol diacrylate, isocyanuric acid EO-modified diacrylate, bisphenol F EO-modified diacrylate, bisphenol A EO-modified diacrylate, 3-methylpentanediol di(meth)acrylate, poly-1,2-butadiene di(meth)acrylate, 3-methylpentanediol diacrylate, diethylene glycol bis-α-acryloyloxypropionate, hydroxypivalate neopentyl glycol diacrylate, bisphenol A diglycidyl ether acrylate, pentaerythritol triacrylate, trimetylol, propane triacrylate, trimethylolethane triacrylate, isocyanuric acid EO-modified triacrylate, N-vinylpyrrolidone, ethylacrylate, and propylacrylate; methacrylates such as ethyl methacrylate, propyl methacrylate, isopropyl methacrylate, butyl methacrylate, hexyl methacrylate, isooctyl methacrylate, 2-hydroxyethyl methacrylate, cyclohexyl methacrylate, and nonylphenyl methacrylate; tetrafurfuryl methacrylate and its derivatives such as caprolactone-modified products; styrene, α-methylstyrene, acrylic acid or the like and mixtures thereof.

The resin contains one or two functional groups. Specific examples of such "functional group" include (meth)acrylate functional, hydroxyl, carboxyl, epoxy, amino, vinyl, and alkoxyl groups and mixtures thereof. Preferred are (meth) acrylate functional groups.

2) Penetrative Solvent

In the thin film formation, the resin may be used as a mixture with a penetrative solvent. In the present invention, the penetrative solvent mainly refers to a solvent penetrative into the light transparent base material. This penetrative solvent may be penetrative into the hardcoat layer. The penetrative solvent has the effect of effectively preventing the occurrence of interference fringes in the optical laminate.

Specific examples of penetrative solvents include alcohols such as methanol, ethanol, isopropyl alcohol, butanol, isobutyl alcohol, methyl glycol, methyl glycol acetate, methyl cellosolve, ethyl cellosolve, and butyl cellosolve; ketones such as acetone, methyl ethyl ketone, methyl isobutyl ketone, cyclohexanone, and diacetone alcohol; esters such as methyl formate, methyl acetate, ethyl acetate, ethyl lactate and butyl acetate; nitrogen-containing compounds such as nitromethane, N-methyl pyrrolidone, and N,N-dimethyl formamide; ethers such as diisopropyl ether, tetrahydrofuran, dioxane, and dioxolane; halogenated hydrocarbons such as methylene chloride, chloroform, trichloroethane, and tetrachloroethane; other solvents such as dimethyl sulfoxide and propylene carbonate; or mixtures thereof. More preferred penetrative solvents include methyl acetate, ethyl acetate, butyl acetate, and methyl ethyl ketone.

Light Transparent Base Material

The light transparent base material may be a transparent, semi-transparent, colorless or colored material so far as it is transparent to light. Preferably, however, the light transparent base material is colorless and transparent. Specific examples of light transparent base materials include glass plates; or thin films formed, for example, from the following resins: triacetate cellulose (TAC), polyethylene terephthalate (PET), diacetyl cellulose, acetate butylate cellulose, polyethersulfones, and acrylic resins; polyurethane resins; polyesters; polycarbonates; polysulfones; polyethers; trimethylpentene; polyether ketones; and (meth)acrylonitriles and the like. In a preferred embodiment of the present invention, the base material is triacetate cellulose (TAC). The thickness of the light transparent base material is about 30 μm to 200 μm, preferably 40 μm to 200 μm.

Hardcoat Layer

The term "hardcoat layer" used herein refers to a coat layer having a hardness of "H" or more in the pencil hardness test specified in JIS 5600-5-4 (1999). The thickness of the hardcoat layer (on a cured state basis) is preferably in the range of 0.1 to 100 μm, more preferably in the range of 0.8 to 20 μm. The hardcoat layer comprises a resin and an optional component(s).

1) Resin of the Hardcoat Layer

The resin is preferably transparent, and specific examples thereof include three types of resins curable upon exposure to ultraviolet light or electron beams, that is, ionizing radiation curing resins, mixtures of ionizing radiation curing resins and solvent drying-type resins, and heat curing resins. Preferred are ionizing radiation curing resins.

Specific examples of ionizing radiation curing resins include acrylate functional group-containing resins, for example, relatively low-molecular weight polyester resins, polyether resins, acrylic resins, epoxy resins, urethane resins, alkyd resins, spiroacetal resins, polybutadiene resins, polythiolpolyene resins, oligomers or prepolymers of (meth)acrylates or the like of polyfunctional compounds such as polyhydric alcohols, and reactive diluents. Specific examples thereof include monofunctional monomers and polyfunctional monomers such as ethyl (meth)acrylate, ethylhexyl (meth)acrylate, styrene, methylstyrene, N-vinylpyrrolidone, for example, polymethylolpropane tri(meth)acrylate, hexanediol (meth)acrylate, tripropylene glycol di(meth)acrylate, diethylene glycol di(meth)acrylate, pentaerithritol tri(meth) acrylate, dipentaerithritol hexa(meth)acrylate, 1,6-hexanediol di(meth)acrylate, neopentyl glycol di(meth)acrylate, and isocyanuric acid-modified di(or tri)acrylates.

Polyfunctional oligomers and polyfunctional polymers may also be preferably used. Examples thereof include urethane acrylate and urethane methacrylate.

When an ionizing radiation curing resin is used as the ultraviolet curing resin, the use of a photopolymerization initiator is preferred. Specific examples of photopolymerization initiators include acetophenones, benzophenones, Michler's benzoyl benzoate, α-amyloxime ester, tetramethylthiuram monosulfide, and thioxanthones. Further, a photosensitizer is preferably mixed in the resin, and specific examples thereof include n-butylamine, triethylamine, poly-n-butylphosphine.

The solvent drying-type resin mixed into the ionizing radiation curing resin is mainly a thermoplastic resin. Generally exemplified thermoplastic resins may be used. The occurrence of coating film defects in the coating surface can be effectively prevented by adding the solvent drying-type resin.

In a preferred embodiment of the present invention, when the material for the transparent base material is a cellulosic resin such as TAC, specific examples of preferred thermoplastic resins include cellulosic resins, for example, nitrocellulose resins, acetyl cellulose resins, cellulose acetate propionate resins, and ethylhydroxyethylcellulose resins.

Specific examples of heat curing resins include phenolic resins, urea resins, diallyl phthalate resins, melanin resins, guanamine resins, unsaturated polyester resins, polyurethane resins, epoxy resins, aminoalkyd resins, melamine-urea co-condensation resins, silicone resins, and polysiloxane resins. When heat curing resins are used, if necessary, curing agents such as crosslinking agents and polymerization initiators, polymerization accelerators, solvents, viscosity modifiers and the like may also be added.

2) Antistatic Agent and/or Anti-Dazzling Agent

Preferably, the hardcoat layer according to the present invention comprises an antistatic agent and/or an anti-dazzling agent.

Antistatic Agent (Electrically Conductive Agent)

Specific examples of antistatic agents usable for antistatic layer formation include quaternary ammonium salts, pyridinium salts, various cationic compounds containing cationic groups such as primary to tertiary amino groups, anionic compounds containing anionic groups such as sulfonic acid bases, sulfuric ester bases, phosphoric ester bases, and phosphonic acid bases, amphoteric compounds such as amino acid and aminosulfuric acid ester compounds, nonionic compounds such as amino alcohol, glycerin, and polyethylene glycol compounds, organometal compounds such as alkoxides of tin and titanium, and metal chelate compounds such as their acetyl acetonate salts. Further, compounds prepared by increasing the molecular weight of the above exemplified compounds may also be mentioned. Furthermore, monomers or oligomers, which contain a tertiary amino group, a quaternary ammonium group, or a metal chelate part and is polymerizable by an ionizing radiation, or polymerizable compounds, for example, organometal compounds such as coupling agents containing a functional group(s) polymerizable by an ionizing radiation may also be used as the antistatic agent.

Electrically conductive ultrafine particles may also be mentioned. Specific examples of electrically conductive fine particles include fine particles of metal oxides. Such metal oxides include ZnO (refractive index 1.90; numerical value within the parentheses referred to hereinbelow being a refractive index value), $CeO_2$ (1.95), $Sb_2O_2$ (1.71), $SnO_2$ (1.997), indium tin oxide often abbreviated to ITO (1.95), $In_2O_3$ (2.00), $Al_2O_3$ (1.63), antimony doped tin oxide (abbreviation; ATO, 2.0), and aluminum doped zinc oxide (abbreviation; AZO, 2.0). Fine particles refer to particles having a size of not more than 1 micron, that is, the so-called submicron size, preferably having an average particle diameter of 0.1 nm to 0.1 μm.

Anti-Dazzling Agent

The anti-dazzling agent may be the same as described in connection with the anti-dazzling layer which will be described later.

3) Solvents of the Hardcoat Layer

In forming the hardcoat layer, the composition for the hardcoat layer which is a mixture of the above components with a solvent is utilized. Specific examples of solvents include: alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or mixtures thereof. Preferred are ketones and esters.

In forming the hardcoat layer, a composition for a hardcoat layer which is a mixture of the above components with a solvent is utilized. Specific examples of solvents include: alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or mixtures thereof. Preferred are ketones and esters.

Other Layers

As described above, the optical laminate according to the present invention basically comprises a light transparent base material and a thin layer and a hardcoat layer provided on the light transparent base material. However, one or at least two layers, described below, selected by taking into consideration the function or application as the optical laminate may be provided on the hardcoat layer.

Antistatic Layer

The antistatic layer comprises an antistatic agent and a resin. The antistatic agent and the solvent may be the same as described above in connection with the hardcoat layer. The thickness of the antistatic layer is preferably in the range of about 30 nm to 1 μm.

Resin

Specific examples of resins usable herein include thermoplastic resins, heat curing resins, or ionizing radiation curing resins or ionizing radiation curing compounds (including organic reactive silicon compounds). Thermoplastic resins may be used as the resin. More preferably, heat curing resins are used. Still more preferred are ionizing radiation curing resins or ionizing radiation curing compound-containing ionizing radiation curing compositions.

The ionizing radiation curing composition is a composition prepared by properly mixing a prepolymer, oligomer and/or monomer containing a polymerizable unsaturated bond or epoxy group in its molecule together. The ionizing radiation refers to a radiation having an energy quantum which can polymerize or crosslink the molecule among electromagnetic waves or charged particle beams and is generally ultraviolet light or electron beams.

Examples of prepolymers and oligomers in the ionizing radiation curing composition include unsaturated polyesters such as condensates of unsaturated dicarboxylic acids and polyhydric alcohols, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cation polymerizable epoxy compounds.

Examples of monomers in the ionizing radiation curing composition include styrene monomers such as styrene and α-methyl styrene, acrylic esters such as methyl acrylate, 2-ethylhexyl acrylate, methoxyethyl acrylate, butoxyethyl acrylate, butyl acrylate, methoxybutyl acrylate, and phenylacrylate, methacrylic esters such as methyl methacrylate, ethyl methacrylate, propyl methacrylate, methoxyethyl methacrylate, ethoxymethyl methacrylate, phenyl methacrylate, and lauryl methacrylate, unsaturated substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate, unsaturated carboxylic acid amides such as acrylamide and methacrylamide, compounds such as ethylene glycol diacrylate, propylene glycol diacrylate, neopentyl glycol diacrylate, 1,6-hexanediol diacrylate, and triethylene glycol diacrylate, polyfunctional compounds such as dipropylene glycol diacrylate, ethylene glycol diacrylate, propylene glycol dimethacrylate, and diethylene glycol dimethacrylate, and/or polythiol compounds containing two or more thiol groups in the molecule thereof, for example, trimethylolpropane trithioglycolate, trimethylolpropane trithiopropylate, and pentaerythritol tetrathioglycolate.

In general, if necessary, one or a mixture of at least two of the compounds described above is used as the monomer in the ionizing radiation curing composition. In order to impart ordinary coatability to the ionizing radiation curing composition, preferably, the content of the prepolymer or oligomer is brought to not less than 5% by weight, and the content of the monomer and/or polythiol compound is brought to not more than 95% by weight.

When flexibility is required of a film formed by coating the ionizing radiation curing composition and curing the coating, this requirement can be met by reducing the amount of the monomer or using an acrylate monomer having one or two functional groups. When abrasion resistance, heat resistance, and solvent resistance are required of a film formed by coating the ionizing radiation curing composition and curing the coating, this requirement can be met by tailoring the design of the ionizing radiation curing composition, for example, by using an acrylate monomer having three or more functional groups. Monofunctional acrylate monomers include 2-hydroxy acrylate, 2-hexyl acrylate, and phenoxyethyl acrylate. Difunctional acrylate monomers include ethylene glycol diacrylate and 1,6-hexanediol diacrylate. Tri- or higher functional acrylate monomers include trimethylolpropane triacrylate, pentaerythritol triacrylate, pentaerythritol tetraacrylate, and dipentaerythritol hexaacrylate.

In order to regulate properties such as flexibility or surface hardness of a film formed by coating the ionizing radiation curing composition and curing the coating, a resin not curable by ionizing radiation irradiation may also be added to the ionizing radiation curing composition. Specific examples of resins usable herein include thermoplastic resins such as polyurethane resins, cellulosic resins, polyvinyl butyral resins, polyester resins, acrylic resins, polyvinylchloride resins, and polyvinyl acetate. Among them, polyurethane resins, cellulosic resins, polyvinyl butyral resins and the like are preferably added from the viewpoint of improving the flexibility.

When curing after coating of the ionizing radiation curing composition is carried out by ultraviolet light irradiation, photopolymerization initiators or photopolymerization accelerators are added. In the case of radically polymerizable unsaturated group-containing resins, photopolymerization initiators usable herein include acetophenones, benzophenones, thioxanthones, benzoins, and benzoin methyl ethers. They may be used either solely or as a mixture of two or more. In the case of cationically polymerizable functional group-containing resins, photopolymerization initiators usable herein include aromatic diazonium salts, aromatic sulfonium salts, aromatic iodonium salts, metallocene compounds, benzoin sulfonates and the like. They may be used either solely or as a mixture of two or more. The amount of the photopolymerization initiator added is 0.1 to 10 parts by weight based on 100 parts by weight of the ionizing radiation curing composition.

The ionizing radiation curing composition may be used in combination with the following organic reactive silicon compound.

One of organic silicon compounds usable herein is represented by general formula $R_m Si(OR')_n$ wherein R and R' represent an alkyl group having 1 to 10 carbon atoms; and m as a subscript of R and n as a subscript of OR' each are an integer satisfying a relationship represented by $m+n=4$.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Organic silicon compounds usable in combination with the ionizing radiation curing composition are silane coupling agents. Specific examples thereof include γ-(2-aminoethyl) aminopropyltrimethoxysilane, γ-(2-aminoethyl) aminopropylmethyldimethoxysilane, β-(3,4-epoxycyclohexyl) ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyl-tris(β-methoxyethoxy) silane, octadecyldimethyl [3-(trimethoxysilyl)propyl]ammonium chloride, methyltrichlorosilane, and dimethyldichlorosilane.

Anti-Dazzling Layer

The anti-dazzling layer may be provided between the transparent base material and the hardcoat layer or the lower-refractive index layer. The anti-dazzling layer may be formed of a resin and an anti-dazzling agent, and the resin may be properly selected from those described above in connection with the hardcoat layer.

In a preferred embodiment of the present invention, the anti-dazzling layer simultaneously satisfies all the following formulae:

$$30 \leq Sm \leq 600;$$

$$0.05 \leq Rz \leq 1.60;$$

$$0.1 \leq \theta a \leq 2.5;\ \text{and}$$

$$0.3 \leq R \leq 15$$

wherein R represents the average particle diameter of the fine particles, μm; Rz represents the ten point average roughness of concaves and convexes in the anti-dazzling layer, μm; Sm represents average spacing of profile (concave-convex) irregularities in the anti-dazzling layer, μm; and θa represents the average inclination angle of the concave-convex part.

In another preferred embodiment of the present invention, the anti-dazzling layer is such that the fine particles and the transparent resin composition satisfy $\Delta n = |n1 - n2| < 0.1$ wherein n1 represents the refractive index of the fine particles; and n2 represents the refractive index of the transparent resin composition, and, at the same time, the haze value within the anti-dazzling layer is not more than 55%.

Anti-Dazzling Agent

Fine particles may be mentioned as the anti-dazzling agent and may be in the form of sphere, ellipse and the like, preferably sphere. The fine particles may be either inorganic or organic type. The fine particles exhibit anti-dazzling properties and are preferably transparent. Specific examples of fine particles include inorganic fine particles such as silica beads and organic fine particles such as plastic beads. Specific examples of plastic beads include styrene beads (refractive index 1.59), melamine beads (refractive index 1.57), acrylic beads (refractive index 1.49), acrylic-styrene beads (refractive index 1.54), polycarbonate beads, polyethylene beads and the like. The amount of the fine particles added is 2 to 30 parts by weight, preferably about 10 to 25 parts by weight, based on 100 parts by weight of the transparent resin composition.

In preparing the composition for an anti-dazzling layer, the addition of an anti-settling agent is preferred. The addition of the anti-settling agent can suppress the precipitation of resin beads and can homogeneously disperse the resin beads within a solvent. Specific examples of anti-settling agents include silica beads having a particle diameter of not more than 0.5 µm, preferably about 0.1 to 0.25 µm.

The thickness of the anti-dazzling layer (on a cured state basis) is 0.1 to 100 µm, preferably in the range of 0.8 to 10 µm. When the thickness is in this range, the function as the anti-dazzling layer is satisfactory.

Lower-Refractive Index Layer

The lower-refractive index layer may be formed of a thin film comprising a silica- or magnesium fluoride-containing resin, a fluororesin as a lower-refractive index resin, or a silica- or magnesium fluoride-containing fluororesin and having a refractive index of not more than 1.46 and a thickness of about 30 nm to 1 µm, or a thin film formed by chemical deposition or physical deposition of silica or magnesium fluoride. Resins other than the fluororesin are the same as used for constituting the antistatic layer.

More preferably, the lower-refractive index layer is formed of a silicone-containing vinylidene fluoride copolymer. Specifically, this silicone-containing vinylidene fluoride copolymer comprises a resin composition comprising 100 parts of a fluorocopolymer prepared by copolymerization using, as a starting material, a monomer composition containing 30 to 90% (all the percentages being by mass; the same shall apply hereinafter) of vinylidene fluoride and 5 to 50% of hexafluoropropylene, and having a fluorine content of 60 to 70% and 80 to 150 parts of an ethylenically unsaturated group-containing polymerizable compound. This resin composition is used to form a lower-refractive index layer having a refractive index of less than 1.60 (preferably not more than 1.46) which is a thin film having a thickness of not more than 200 nm and to which scratch resistance has been imparted.

For the silicone-containing vinylidene fluoride copolymer constituting the lower-refractive index layer, the content of individual components in the monomer composition is 30 to 90%, preferably 40 to 80%, particularly preferably 40 to 70%, for vinylidene fluoride, and 5 to 50%, preferably 10 to 50%, particularly preferably 15 to 45%, for hexafluoropropylene. This monomer composition may further comprise 0 to 40%, preferably 0 to 35%, particularly preferably 10 to 30%, of tetrafluoroethylene.

The above monomer composition may comprise other comonomer component in such an amount that is not detrimental to the purpose of use and effect of the silicone-containing vinylidene fluoride copolymer, for example, in an amount of not more than 20%, preferably not more than 10%. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The fluorocopolymer produced from this monomer composition should have a fluorine content of 60 to 70%, preferably 62 to 70%, particularly preferably 64 to 68%. When the fluorine content is in the above-defined specific range, the fluoropolymer has good solubility in solvents. The incorporation of the above fluoropolymer as a component can result in the formation of a thin film which has excellent adhesion to various base materials, has a high level of transparency and a low level of refractive index and, at the same time, has satisfactorily high mechanical strength. Therefore, the surface with the thin film formed thereon has a satisfactorily high level of mechanical properties such as scratch resistance which is very advantageous.

Preferably, the molecular weight of the fluorocopolymer is 5,000 to 200,000, particularly preferably 10,000 to 100,000, in terms of number average molecular weight as determined using polystyrene as a standard. When the fluorocopolymer having this molecular weight is used, the fluororesin composition has suitable viscosity and thus reliably has suitable coatability. The refractive index of the fluorocopolymer is preferably not more than 1.45, particularly preferably not more than 1.42, still more preferably not more than 1.40. When a fluorocopolymer having a refractive index exceeding 1.45 is used, in some cases, the thin film formed from the resultant fluorocoating material has a low level of antireflection effect.

The lower-refractive index layer may also be formed of a thin film of $SiO_2$. This lower-refractive index layer may be formed, for example, by vapor deposition, sputtering, or plasma CVD, or by a method in which an $SiO_2$ gel film is formed from a sol liquid containing an $SiO_2$ sol. In addition to $SiO_2$, a thin film of $MgF_2$ or other material may constitute the lower-refractive index layer. However, the use of a thin film of $SiO_2$ is preferred from the viewpoint of high adhesion to the lower layer. Among the above methods, when plasma CVD is adopted, a method is preferably adopted in which an organosiloxane is used as a starting gas and the CVD is carried out in such a state that other inorganic vapor deposition sources are not present. Further, preferably, in the CVD, the substrate is kept at the lowest possible temperature.

In a preferred embodiment of the present invention, "void-containing fine particles" are utilized. The "void-containing fine particles" can lower the refractive index while maintaining the strength of the lower-refractive index layer. In the present invention, the expression "void-containing fine particles" refers to fine particles that have a structure containing gas filled into fine particles and/or a gas-containing porous structure and have a refractive index which is lowered inversely proportionally to the proportion of gas in the fine particles as compared with the refractive index of the fine particles per se. Further, in the present invention, the fine particles include those which can form a nanoporous structure in at least a part of the inside and/or surface of the fine particle depending upon the form, structure, aggregation state, and dispersion state of the fine particles within the coating film.

Specific examples of preferred void-containing inorganic fine particles include silica fine particles prepared by a technique disclosed in Japanese Patent Laid-Open No. 233611/2001. The void-containing silica fine particles can easily be produced, and the hardness of the void-containing silica fine particles per se is high. Therefore, when a lower-refractive index layer is formed of a mixture of the void-containing silica fine particles with a binder, the layer strength can be improved and the refractive index can be regulated to fall within a range of about 1.20 to 1.45. In particular, specific examples of preferred void-containing organic fine particles include empty polymer fine particles prepared by a technique disclosed in Japanese Patent Laid-Open No. 80503/2002.

Fine particles which can form a nanoporous structure in at least a part of the inside and/or surface of the coating film include, in addition to the above silica fine particles, sustained release materials which have been produced for increasing the specific surface area and adsorb various chemical substances in a packing column and a porous part provided on the surface thereof, porous fine particles for catalyst fixation purposes, or dispersions or aggregates of empty fine particles to be incorporated in insulating materials or low-permittivity materials. Specific examples thereof include those in a preferred particle diameter range of the present invention selected from commercially available products, for example, aggregates of porous silica fine particles selected from Nipsil or Nipgel (tradenames, manufactured by Nippon Silica Industrial Co., Ltd.), Colloidal silica (tradename) UP series, manufactured by Nissan Chemical Industries Ltd. having a structure in which silica fine particles are connected to one another in a chain form.

The average particle diameter of the "void-containing fine particles" is not less than 5 nm and not more than 300 nm. Preferably, the lower limit is 8 nm, and the upper limit is 100 nm. More preferably, the lower limit is 10 nm, and the upper limit is 80 nm. When the average particle diameter of the fine particles is in the above-defined range, excellent transparency can be imparted to the lower-refractive index layer.

Anti-Fouling Layer

In a preferred embodiment of the present invention, an anti-fouling layer may be provided for preventing fouling of the outermost surface of the lower-refractive index layer. Preferably, the anti-fouling layer is provided on the surface of the light transparent base material remote from the lower-refractive index layer. The anti-fouling layer can further improve anti-fouling properties and scratch resistance of the antireflective laminate.

Specific examples of agents for the anti-fouling layer include fluorocompounds and/or silicon compounds, which have low compatibility with an ionizing radiation curing resin composition having a fluorine atom in its molecule and cannot be incorporated into the lower-refractive index layer without difficulties, and fluorocompounds and/or silicon compounds which are compatible with an ionizing radiation curing resin composition having a fluorine atom in its molecule and fine particles.

2. Process for Producing the Optical Laminate

Preparation of Liquid Composition

Each liquid composition for the antistatic layer, the thin layer, the hardcoat layer and the like may be prepared according to a conventional preparation method by mixing the above-described components together and subjecting the mixture to dispersion treatment. The mixing and dispersion can be properly carried out, for example, by a paint shaker or a beads mill.

Coating

Specific examples of methods for coating each liquid composition onto a surface of the light transparent base material and a surface of the antistatic layer include various methods such as spin coating, dip coating, spraying, die coating, bar coating, roll coating, meniscus coating, flexographic printing, screen printing, and bead coating.

3. Use of Optical Laminate

The optical laminate according to the present invention as a hardcoat laminate is preferably utilized as antireflective laminates (including utilization as anti-dazzling laminates). The optical laminate according to the present invention is utilized in transmission display devices. In particular, the optical laminate according to the present invention is used for display in televisions, computers, word processors and the like, especially on display surfaces, for example, in CRTs or liquid crystal panels.

EXAMPLES

The following Examples further illustrate the present invention. However, it should be noted that the invention is not to be construed as being limited thereto.

Preparation of Composition for the Thin Layer

A composition for a thin layer was prepared by mixing ingredients together according to the following formulation and filtering the mixture.

Composition 1 for the Thin Film

| | |
|---|---|
| Polyethylene glycol diacrylate ("M 240"; weight average molecular weight 302; manufactured by TOAGOSEI CO., LTD.) | 10 pts. wt |
| Polymerization initiator (Irgacure 184) | 0.4 pt. wt. |
| Methyl acetate | 15 pts. wt |

Composition 2 for the Thin Film

| | |
|---|---|
| Isocyanuric acid-modified EO-modified triacrylate (M 315; weight average molecular weight 300; manufactured by TOAGOSEI CO., LTD.) | 10 pts. wt |
| Polymerization initiator (Irgacure 184) | 0.4 pt. wt. |
| Methyl ethyl ketone | 15 pts. wt |

Composition 3 for the Thin Film

| | |
|---|---|
| Polyester acrylate (M 9050; molecular weight 418; manufactured by TOAGOSEI CO., LTD.) | 10 pts. wt |

Preparation of Composition for the Hardcoat Layer

A composition for a hardcoat layer was prepared by mixing ingredients together according to the following formulation and filtering the mixture.

Composition 1 for the Hardcoat Layer

| | |
|---|---|
| Dipentaerythritol hexaacrylate (manufactured by Nippon Kayaku Co., Ltd.) | 10 pts. wt |
| Polymerization initiator (Irgacure 184) | 0.4 pt. wt. |
| Toluene | 10 pts. wt |

Composition 2 for the Hardcoat Layer

| | |
|---|---|
| Polyfunctional urethane acrylate (UV 1700 B; manufactured by Nippon Synthetic Chemical) | 10 pts. wt |
| Polymerization initiator (Irgacure 184) | 0.4 pt. wt. |
| Toluene | 10 pts. wt |

Composition 3 for the Hardcoat Layer

| | |
|---|---|
| Dipentaerythritol hexaacrylate (manufactured by Nippon Kayaku Co., Ltd.) | 5 pts. wt |
| Polyfunctional urethane acrylate (BEAM SET 371; manufactured by Arakawa Chemical Industries, Ltd.) | 5 pts. wt |

Preparation of the Optical Laminate

Example 1

Composition 1 for a thin film was coated onto one side of a cellulose triacetate film (thickness 80 μm) as a substrate at a coverage of 15 g/m² in terms of wet weight (dry weight 6 g/m²). The coating was dried at 50° C. for 30 sec. The dried coating was exposed to ultraviolet light at 100 mJ/cm² to cure the coating. Thereafter, composition 2 for a hardcoat layer was coated at a coverage of 15 g/m² in terms of wet weight (dry weight 6 g/m²). The coating was dried at 50° C. for 30 sec. The dried coating was exposed to ultraviolet light at 100 mJ/cm² to cure the coating.

Example 2

An optical laminate was prepared in the same manner as in Example 1, except that a 40 μm-thick cellulose triacetate film was used, composition 1 for a thin layer was changed to composition 2 for a thin film layer, and composition 1 for a hardcoat layer was changed to composition 2 for a hardcoat layer.

Example 3

An optical laminate was prepared in the same manner as in Example 1, except that a 40 μm-thick cellulose triacetate film was used, composition 1 for a thin film was changed to composition 3 for a thin film, and composition 1 for a hardcoat layer was changed to composition 3 for a hardcoat.

Comparative Example 1

An optical laminate was prepared in the same manner as in Example 1, except that the thin layer was not formed.

Comparative Example 2

An optical laminate was prepared in the same manner as in Example 1, except that, in the preparation of composition 1 for a thin layer, methyl acetate was changed to toluene.

Evaluation Test

The optical laminates prepared in the Examples and Comparative Examples were subjected to the followng evaluation tests. The results are shown in Table 1.

Evaluation 1: Interference Fringes

A black tape for the prevention of reflection of light from backside was applied to the surface of the optical laminate remote from the hardcoat layer, and the optical laminate was visually inspected from the surface of the hardcoat layer. The results were evaluated based on the following criteria.

Evaluation Criteria

⊚: Interference fringes did not occur.

x: Interference fringes occurred.

Evaluation 2: Interface

The section of the optical laminate was observed in a transmission manner under a confocal laser microscope (Leica TCS-NT; magnification "500 to 1000", manufactured by Leica Microsystems) to determine whether or not an interface is present. The results were evaluated according to the following criteria. Specifically, in order to obtain halation-free sharp images, a wet-type objective lens was used in the confocal laser microscope, and about 2 ml of an oil having a refractive index of 1.518 was placed on the optical laminate for evaluation of the interface. The oil was used for allowing an air layer between the objective lens and the optical laminate to disappear.

Evaluation Criteria

⊚: No interface was observed (note 1).

x: An interface was observed (note 2).

Notes 1 and 2

Figure 1:
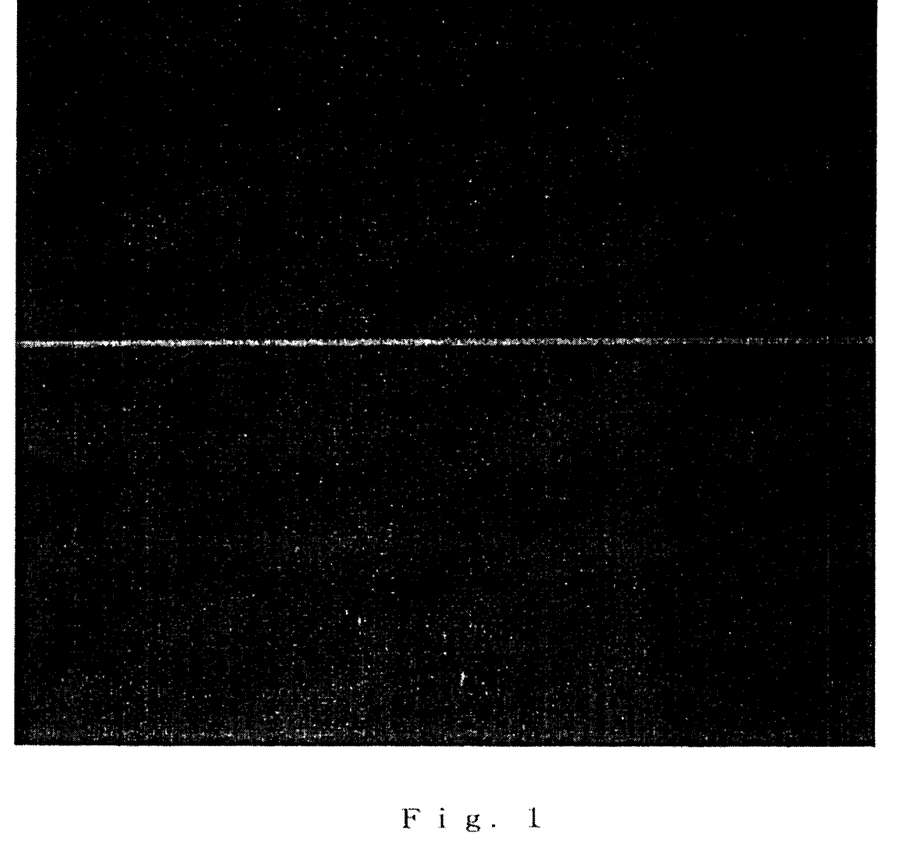
FIG. 1 is a laser microphotograph of the section of an optical laminate according to the present invention.

Note 1: In all the Examples of the present invention, as shown in FIG. 1, only the interface of oil surface (upper layer)/hardcoat layer (lower layer) was observed, and the interface between the hardcoat layer and the light transparent base material was not observed.

Figure 2:
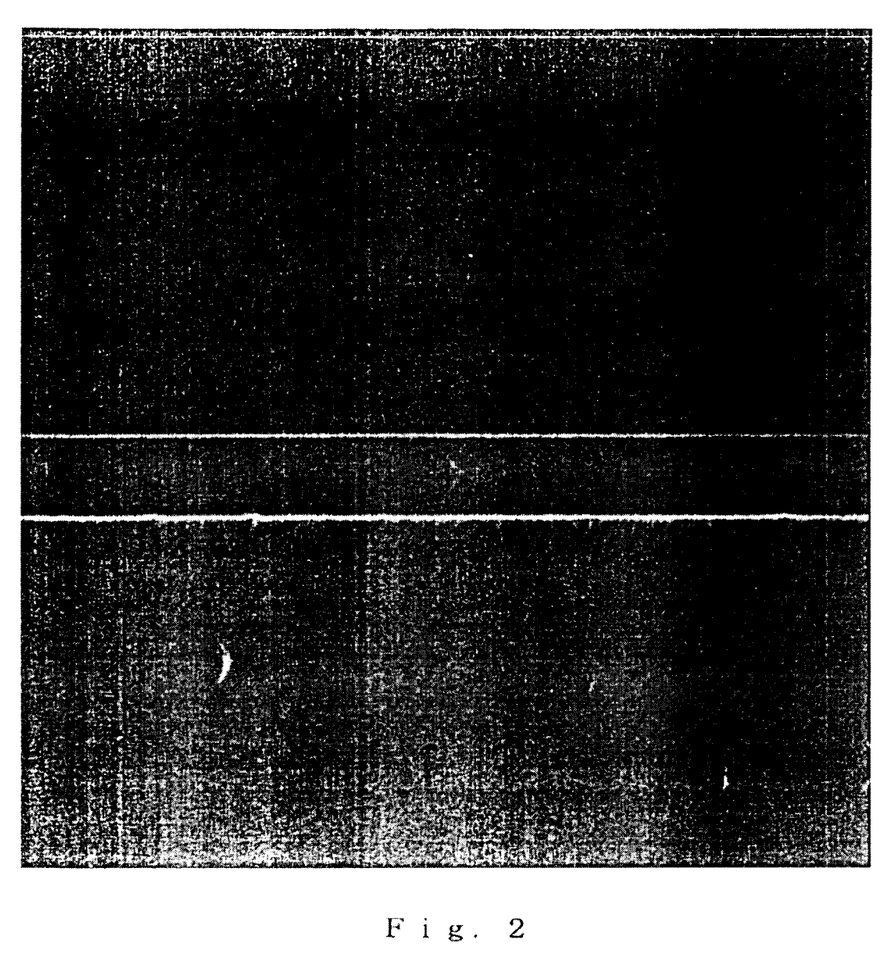
FIG. 2 is a laser microphotograph of the section of a comparative optical laminate.

Note 2: For all the Comparative Examples, as shown in FIG. 2, an interface was observed in mutual boundaries of oil surface (upper layer)/hardcoat layer (middle layer)/light transparent base material (lower layer).

TABLE 1

|  | Evaluation 1 | Evaluation 2 |
| --- | --- | --- |
| Ex. 1 | ⊚ | ⊚ |
| Ex. 2 | ⊚ | ⊚ |
| Ex. 3 | ⊚ | ⊚ |
| Comp. Ex. 1 | x | x |
| Comp. Ex. 2 | x | x |

The invention claimed is:

1. An optical laminate comprising:

a light transparent base material, a thin layer and a hardcoat layer provided in that order on the light transparent base material;

wherein the thin layer has a thickness of 0.01 μm to 20 μm and comprises a resin having a weight average molecular weight of 200 to 1000 with one to three (meth) acrylate functional groups, and a penetrative solvent that penetrates into the light transparent base material and the hardcoat layer; and wherein no interface is present between the light transparent base material and the hardcoat layer, and interference fringes are not visually observed when a section of the optical laminate is evaluated under a laser microscope.

2. The optical laminate according to claim 1, wherein the thin layer further comprises at least one resin selected from the group consisting of acrylic resins, polyester resins, polyolefin resins, polycarbonate resins, poly amide resins, poly ether resins, epoxy resins, urethane resins, alkyd resins, spiroacetal resins, polybutadiene resins, polythiol polyether resins, and polyhydric alcohols.

3. The optical laminate according to claim 1, wherein the resin further comprises at least one functional group selected from the group consisting of a hydroxyl group, a carboxyl group, an epoxy group, an amino group, a vinyl group, and alkoxyl groups.

4. The optical laminate according to claim 1, wherein the hardcoat layer comprises at least one of an antistatic agent and an anti-dazzling agent.

5. The optical laminate according to claim 1, further comprising at least one or at least two of an antistatic layer, an anti-dazzling layer, a lower-refractive index layer, and an anti-fouling layer provided on the hardcoat layer.

6. The optical laminate according to claim 1, which is used as an antireflective laminate.

7. An optical laminate comprising:

a light transparent base material;

a hardcoat layer; and means for eliminating an interface between the light transparent base material and the hardcoat layer provided between the light transparent base material and the hardcoat layer, said means comprising a thin layer having a thickness of 0.01 μm to 20 μm and comprising a resin having a weight average molecular weight of 200 to 1000 with one to three (meth)acrylate functional groups and a penetrative solvent that penetrates into the light transparent base material and the hardcoat layer.

8. The optical laminate according to claim 7, wherein said means for eliminating the interface between the light transparent base material and the hardcoat layer prevents interface reflection and interference fringes, whereby interference fringes are not visually observed when a section of the optical laminate is evaluated under a laser microscope.

9. An optical laminate produced by a method comprising the steps of:

providing a light transparent base material;

providing a thin layer having a thickness of 0.01 μm to 20 μm on the light transparent base material, the thin layer comprising a resin having a weight average molecular weight of 200 to 1000 with one to three (meth)acrylate functional groups and a penetrating solvent; and providing a hardcoat layer on the thin layer;

wherein the penetrating solvent penetrates into the light transparent base material and the hardcoat layer, such that the thin layer eliminates an interface between the light transparent base material and the hardcoat layer so as to prevent interface reflection and interference fringes, whereby interference fringes are not visually observed when a section of the optical laminate is evaluated under a laser microscope.

* * * * *